March 22, 1938.  E. F. LASCHINGER ET AL  2,112,166
LIQUID CONTROLLED BRAKE MECHANISM
Filed April 4, 1935
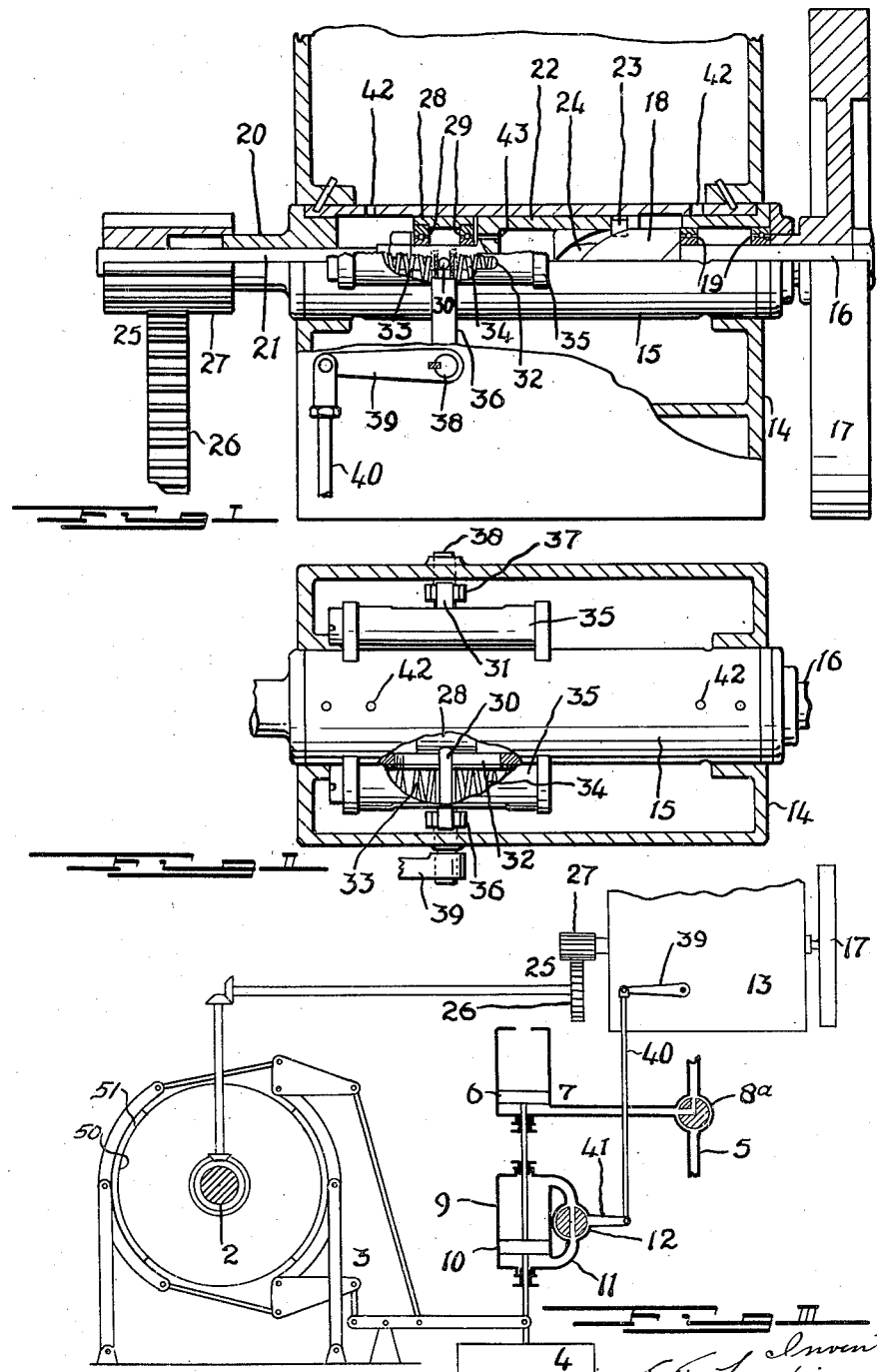

Patented Mar. 22, 1938

2,112,166

UNITED STATES PATENT OFFICE 2,112,166

LIQUID CONTROLLED BRAKE MECHANISM

Edgar Frederick Laschinger and William George Jackson, Johannesburg, Union of South Africa, assignors to Dowson & Dobson Limited Application April 4, 1935, Serial No. 14,724 In Union of South Africa June 2, 1934

3 Claims. (Cl. 188—180)

This invention relates to braking operations and brake mechanism for arresting a moving load, of the kind which is used particularly in hoisting apparatus and in which the rate of approach of relatively moving friction-generating surfaces—such as those of a brake drum and a brake shoe applied by a weight—is controlled by flow of liquid through a restricted channel.

In the operation of such mechanism the rate of deceleration of the load controlled by the brake tends to increase progressively owing to the progressively increasing pressure set up between the friction-generating surfaces; with the result that the moving load is finally stopped abruptly. This undesirable result occurs particularly in the case of automatic emergency braking where the above-mentioned tendency is not subject to the control of the hoist driver. It is the object of the invention to overcome this drawback; and specifically to provide for the braking force rapidly attaining the desired value and then remaining constant until the hoist is stopped.

According to the invention, the flow of the controlling liquid is so governed by the deceleration of the load, that when a predetermined deceleration value has been attained, the flow of liquid is stopped to prevent such deceleration value increasing and so also that as the deceleration value thereafter decreases and reaches substantially zero, the flow of liquid is permitted. In consequence of this last named action, the braking pressure is brought to its maximum immediately after the load has been stopped.

A deceleration governor according to the invention comprises an inertia mass which is in driving engagement with the load through a connection which yields correspondingly with the force or torque transmitted through it. Such yielding movement is arranged, upon attaining a pre-arranged extent, to close a valve controlling the flow of the brake-controlling liquid.

An example of the invention is shown in the accompanying drawing, in which:

Figure I is an elevation of the governor with parts in section.

Figure II is a partial plan thereof.

Figure III is a diagrammatic view of a brake system embodying the governor.

Referring to Figure III, 2 is the shaft of a hoist fitted with a brake 3 which is applied by means of a weight 4; and comprises relatively movable friction generating surfaces 50, 51. The weight is lifted to release the brake by steam or compressed air admitted through pipe 5 to the underside of the piston 6 of the brake engine 7; whilst exhaust of the steam or air permits the weight to descend to re-apply the brake. The means for thus admitting and exhausting steam or air under the piston 6 is indicated by the three-way rotary valve 8, having an exhaust passage 8a.

The descent of the weight 4 is controlled by a dash pot comprising the cylinder 9 and the piston 10. The cylinder is charged with oil which can flow from end to end through the by-pass 11. Said by-pass is controlled by the rotary valve 12; by adjustment of which the flow of oil can be stopped and the weight 4 prevented from descending. The governor, indicated by 13 in this figure, controls said valve 12.

Referring to Figures I and II, the governor comprises the casing 14, in which is fixed the sleeve 15. 16 is a shaft carrying the flywheel 17 at one end and formed with an enlarged cylindrical head 18 at its other end. Said shaft is mounted in the sleeve 15 by means of bearings 19 which act both as radial and thrust bearings to resist axial displacement of the shaft.

At the opposite end of the sleeve is a bearing 20 in which a shaft 21 is free both to rotate and to move axially. Said shaft has formed at its inner end a cylinder 22 in which the head 18 is housed. Said head 18 and cylinder 22 are formed as a screw and nut pair by means of rollers 23 fixed on one of them engaging helical grooves 24 of long pitch on the other.

The shaft 21 is driven from the hoist by means of mechanism 25 including a toothed wheel 26 and a pinion 27 on the shaft 21 long enough to remain in engagement with the wheel 26 notwithstanding axial movement of the shaft 21.

The shaft 21 in turn drives the flywheel 17 through the screw and nut mechanism. The effect of the latter is that owing to the reluctance of the flywheel to change its rotational speed, slowing of the shaft 21 results in said shaft being axially displaced. The displacement is to the right or left according to the direction in which the hoist happens to be rotating.

Such axial displacement of the shaft is imparted to a collar 28 so mounted on said shaft by bearings 29 as to be free from the rotational movement of the shaft but to move axially therewith. Pins 30, 31 project from said collar through slots 32 in the sleeve and are engaged by springs 33, 34 carried in fixed housings 35. Said springs yieldingly resist axial displacement of the shaft 21 from the neutral position shown, so causing such axial displacement to vary correspondingly with the torque transmitted through the screw and nut connection.

The pins 30, 31 also engage arms 36, 37 fast on a cross shaft 38. Said shaft rigidly carries an arm 39 connected by link 40 to the arm 41 of the rotary plug of valve 12, which is such as to close the valve when rotated in either direction from the open position shown.

The casing 14 contains oil which is free to enter the sleeve 15 through holes 42 so that it lubricates the moving parts therein. The oil also fills the cylinder 22; being free to flow into and out of said cylinder by way of small holes 43. The cylinder 22 and head 18 thus operate as a dash-pot to damp out undesired movements of the governor brought about by cyclic irregularities of the hoist.

The operation is as follows: When the hoist is operating at constant speed the flywheel 17 is being driven through shafts 21 and 16. Collar 28 is in its normal position and holds the dash-pot controlling valve 12 open. Upon the braking operation being initiated by opening exhaust valve 8 the weight 4 descends, carrying with it the piston 10 of the dash-pot. The resistance in the by-pass 11 of the latter is usually made such as to cause the weight to descend and apply the brakes gradually. However, if no further governing means are present, the dash-pot piston would continue to descend and so permit the weight to continue to tighten the brakes.

Such indefinite tightening of the brakes is obviated by the governor. As the hoist speed decreases owing to the application of the brakes, the speed of pinion 27 correspondingly decreases. Flywheel 17 being reluctant to change its speed, shaft 21 is axially displaced. It is arranged that with a certain amplitude of such displacement, corresponding to the desired rate of deceleration, valve 12 is closed. Further movement of the dash-pot piston 10 and therefore of the brakes is thereby prevented and the desired degree of deceleration of the hoist is maintained until the hoist is stopped. Thereupon rotational movement of the governor parts is stopped; shaft 21 is slid back by the springs 33, 34 to its neutral position, (the flywheel correspondingly rotating reversely) and valve 12 is thereby opened so enabling the weight 4 to apply the brakes 3 without restraint.

The oil actuated type of brake mechanism in which, in order to cause the application of the brakes, oil is exhausted from under the piston 10 and is passed off through a drain pipe after passing through controlling valves, may be modified according to the present invention by inserting the governor-controlled valve 12 in said drain pipe. Said valve then stops outflow of oil when the proper deceleration value is reached, so that the brake pressure is maintained constant, as in the example described.

We claim:

1. The combination with a movable load, brake mechanism for arresting the load including relatively movable friction-generating surfaces and brake applying means for forcing said surfaces together, limiting means so opposing said brake applying means as to limit the rate of approach of said surfaces and dependent upon flow of liquid through a restricted channel, an inertia mass, a driving connection between said mass and the load, said connection adapted to yield correspondingly with the torque or force transmitted through it, and a valve adapted to close said channel and actuated by said yielding movement.

2. A governor for braking mechanism of the kind herein specified, comprising a pair of alined rotatable shafts relatively displaceable axially, one such shaft being adapted for driving engagement with hoist mechanism, a fly wheel on the other shaft, said shafts being connected by a screw and nut formation whereby torque exerted between them causes their relative axial displacement, spring means controlling such relative axial displacement so that it varies with the torque, means for transmitting a governing movement derived from their axial displacement, and damping means for the shafts adapted to regulate their relative axial displacement.

3. A governor as claimed in claim 2, in which the means for regulating the axial displacement consists of a dash pot device comprising a cylinder on one shaft and a co-acting piston on the other shaft.

EDGAR FREDERICK LASCHINGER.
WILLIAM GEORGE JACKSON.